US009706785B2

(12) United States Patent
Breha, III

(10) Patent No.: US 9,706,785 B2
(45) Date of Patent: Jul. 18, 2017

(54) METHOD OF PREPARING FLAVORED COFFEES USING REDUCED AMOUNT OF FLAVORANT

(71) Applicant: The Folger Coffee Company, Orrville, OH (US)

(72) Inventor: Paul Jeffrey Breha, III, Seven Hills, OH (US)

(73) Assignee: THE FOLGER COFFEE COMPANY, Orrville, OH (US)

( * ) Notice: Subject to any disclaimer, the term of this patent is extended or adjusted under 35 U.S.C. 154(b) by 158 days.

(21) Appl. No.: 14/326,581

(22) Filed: Jul. 9, 2014

(65) Prior Publication Data

US 2016/0007627 A1 Jan. 14, 2016

(51) Int. Cl.

*A23F 5/46* (2006.01)
*A23F 5/00* (2006.01)
*A23F 5/40* (2006.01)
*A23F 5/26* (2006.01)

(52) U.S. Cl.

CPC ................ *A23F 5/465* (2013.01); *A23F 5/00* (2013.01); *A23F 5/267* (2013.01); *A23F 5/40* (2013.01)

(58) Field of Classification Search

CPC .... A23F 5/00; A23F 5/40; A23F 5/267; A23F 5/465

See application file for complete search history.

(56) References Cited

U.S. PATENT DOCUMENTS 4,528,200 A * 7/1985 Coleman ................. A23F 5/267 426/250
6,841,185 B2 1/2005 Sargent et al.
2006/0024420 A1 2/2006 Kessler
2007/0071869 A1* 3/2007 Knitel ................. A47J 31/0647 426/595
2007/0178215 A1* 8/2007 Beeson .................. A23C 11/00 426/594
2007/0184172 A1 8/2007 Timmerman
2009/0011095 A1 1/2009 Yamane et al.
2011/0236545 A1 9/2011 Brown et al.
2014/0004244 A1* 1/2014 Putter ...................... A23L 2/56 426/580

FOREIGN PATENT DOCUMENTS

WO 2005018394 3/2005

* cited by examiner

*Primary Examiner* — Anthony Weier

(74) *Attorney, Agent, or Firm* — Michael A. Olshavsky; Christopher L. Smith

(57) ABSTRACT

The present invention provides to a method of preparing a flavored coffee using reduced amount of flavorant, and a coffee composition used for preparing such flavored coffee. An amount of colorant is used to replace up to 20.1% by weight of the flavorant present in a flavored coffee beverage. The flavor perception of the coffee beverage containing reduced amount of flavorant is equivalent to that of the original coffee beverage containing regular amount of flavorant.

19 Claims, No Drawings

METHOD OF PREPARING FLAVORED COFFEES USING REDUCED AMOUNT OF FLAVORANT

CROSS REFERENCE TO RELATED APPLICATIONS

Not applicable.

FIELD OF THE INVENTION

The present invention generally relates to a method of preparing a flavored coffee, and more particularly, relates to a method of preparing a flavored coffee using reduced amount of flavorant, and a coffee composition used for preparing such flavored coffee.

BACKGROUND OF THE INVENTION

A flavorant is typically added to a food or drink to impart a desired flavor into the food or drink. However, the larger the amount of flavorant used, the more "unnatural" or "artificial" will be the consumer's perception of the flavor of the food or drink. Moreover, using a larger amount of flavorant is not cost-effective either.

Thus, there exists a need for a method of preparing a flavored food/drink, such as coffee, using a reduced amount of flavorant, but not at the cost of decreasing the consumer's perceived acceptability associated with the flavor.

SUMMARY OF THE INVENTION

It is an object of the present invention to provide method of preparing a coffee beverage using reduced amount of flavorant, but still giving a "full" flavor perception.

It is another object of the present invention to provide a coffee composition comprising a roasted and ground coffee and a reduced amount of flavorant, which, upon brewing, produces a coffee beverage having a "full" flavor perception.

Additional objects will become apparent hereinafter and still others will be obvious to one skilled in the art to which the invention pertains.

Accordingly, a first aspect of the present invention relates to method of preparing a coffee beverage using reduced amount of flavorant, which comprises:

(i) providing a first coffee composition comprising a colorant, a flavorant, and a roasted and ground coffee, wherein the amount of said colorant is C parts, and the amount of said flavorant is $(F-\Delta F)$ parts, based on 100 parts by weight of said roasted and ground coffee, and wherein $C>0$, $(F-\Delta F)>0$, and $(F\times 20.1\%)\geq\Delta F>0$;

(ii) extracting the coffee composition with water to make a coffee brew; and (iii) mixing a whitening agent and a sweetener into the coffee brew to produce the coffee beverage. The flavor perception of this coffee beverage is equivalent to the flavor perception of a coffee beverage produced from the same steps (i)-(iii) using a second coffee composition, which is the same as the first coffee composition except that $C=0$ and $\Delta F=0$.

A second aspect of the present invention relates to coffee composition comprising a colorant, a flavorant, and a roasted and ground coffee. The amount of said colorant is C parts, and the amount of said flavorant is $(F-\Delta F)$ parts, based on 100 parts by weight of said roasted and ground coffee. $C>0$, $(F-\Delta F)>0$, and $(F\times 20.1\%)\geq\Delta F>0$. The coffee composition can be extracted with water to make a coffee brew. A coffee beverage can be produced by mixing a whitening agent and a sweetener into the coffee brew. The flavor perception of such coffee beverage is equivalent to the flavor perception of a reference coffee beverage produced likewise from a coffee composition comprising no colorant, and F parts of the same flavorant, based on 100 parts by weight of the same roasted and ground coffee.

DETAILED DESCRIPTION OF THE INVENTION

The following discussion is presented to enable a person skilled in the art to make and use one or more of the present embodiments. The general principles described herein may be applied to embodiments and applications other than those detailed below without departing from the spirit and scope of the disclosure. Therefore, the present embodiments are not intended to be limited to the particular embodiments shown, but are to be accorded the widest scope consistent with the principles and features disclosed or suggested herein.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported with relative precision. Any numerical values, however, inherently contain certain errors necessarily resulting from error found in their respective measurements.

In various embodiments of the invention, an amount of colorant is used to replace a portion of the flavorant present in a flavored coffee beverage. Surprisingly, the flavor perception of the coffee beverage containing less amount of flavorant is equivalent to that of the original coffee beverage containing a standard (i.e., higher) amount of flavorant.

An embodiment of the invention is represented by the first coffee composition as described in the SUMMARY OF THE INVENTION. The first coffee composition comprises a colorant, a flavorant, and a roasted and ground coffee. The amount of the colorant is $C>0$ parts, and the amount of the flavorant is $(F-\Delta F)>0$ parts wherein $(F\times 20.1\%)\geq\Delta F>0$, based on 100 parts by weight of said roasted and ground coffee. The second coffee composition, used as the control in the present invention, is the same as the first coffee composition except that $C=0$ and $\Delta F=0$. In other words, the second coffee composition comprises $C=0$ parts of colorant and F parts of flavorant, based on 100 parts by weight of the roasted and ground coffee. In contrast, the first coffee composition contains C parts more colorant, but ΔF parts less flavorant, than the second coffee composition. However, coffee beverages made from the first and second compositions are perceived as having a full amount of flavor (same strength as coffee beverages madding using a standard amount of flavorant). In other words, by adding an appropriate kind and amount of colorant, up to 20.1% of flavorant may be reduced, but still giving the full flavor perception (in other words, not at the cost of reduced flavor).

Roasted and Ground Coffee:

Roasted and ground coffee in the present invention may be made from any coffee beans or mixture thereof, either in their natural state or after being subject to various mechanical, physical, chemical, and/or biological treatments. Coffee beans are the seeds of "cherries" that grow on coffee trees in a narrow subtropical region around the world. There are many coffee varieties, however, it is generally recognized that there are two primary commercial coffee species: *Coffea arabica* (herein "*Arabica*(s)") and *Coffea canephora* var. *robusta* (herein "*Robusta*(s)"). Coffees from the species *arabica* may be described as "Brazils," which come from Brazil, or "Other Milds" which are grown in other premium coffee producing countries. Premium *Arabica* countries are generally recognized as including Colombia, Guatemala, Sumatra, Indonesia, Costa Rica, Mexico, United States (Hawaii), El Salvador, Peru, Kenya, Ethiopia and Jamaica. Coffees from the species *canephora* var. *robusta* are typically used as a low cost extender or as a source of additional caffeine for *Arabica* coffees. These *Robusta* coffees are typically grown in the lower regions of West and Central Africa, India, South East Asia, Indonesia, and Brazil.

When removed from the coffee cherry, coffee beans normally have a distinctly green color and a high moisture content. Therefore, they are normally dried prior to export, typically to a moisture content of about 12%. Historically, solar drying was the method of choice, although machine drying is now normally used due to the reliability and efficiency of the machine dryers available for this purpose. After drying to a moisture content of about 12%, the coffee beans are typically exported to consuming nations where they are processed into conventional ground roast coffee by roasting followed by grinding. Any of the variety of roasting techniques known to the art can be used to roast the green coffee in the process of this invention. In the normal operation of preparing conventional roast and ground coffee, coffee beans may be roasted in a hot gas medium at temperature ranges of about 176.8-371.1° C. (350-700° F.), with the time of roasting being dependent on the flavor characteristics desired in the coffee beverage when brewed. Where coffee beans are roasted in a batch process, the batch roasting time at the hereinbefore given temperatures is generally from about 2 minutes to about 20 minutes. Where coffee beans are roasted in a continuous process, the residence time of the coffee beans in the roaster is typically from about 30 seconds to about 9 minutes. The roasting procedure can involve static bed roasting as well as fluidized bed roasting. While any method of heat transfer can be used in this regard, convective heat transfer, especially forced convection, is normally used for convenience. The convective media can be an inert gas or, more typically, air. Typically, the beans are charged to a bubbling bed or fluidized bed roaster where they contact a hot air stream at inlet air temperature of from about 350° to about 1200° F. (about 177° C. to about 649° C.), at roast times form about 10 seconds to not longer than about 5.5 minutes.

As well known to coffee professionals, it is conventional to refer to the degree or extent to which coffee beans are roasted in terms of their Hunter color level. The Hunter Color "L" scale system is generally used to define the color of the coffee beans and the degree to which they have been roasted. Hunter Color "L" scale values are units of light reflectance measurement, and the higher the value is, the lighter the color is since a lighter colored material reflects more light. Thus, in measuring degrees of roast, the lower the "L" scale value the greater the degree of roast, since the greater the degree of roast, the darker is the color of the roasted bean. This roast color is usually measured on the roasted, quenched and cooled coffee beans prior to subsequent processing (e.g., grinding and/or flaking) into a brewed coffee product. However, color may be measured on finished product, in which case the color will be designated as such. The ground roast coffee of the invention can be made from coffee beans roasted to any desired roast color from about 10 L (very dark) to about 25 L (very light).

Once the coffee beans are roasted, they are ground to a desired average particle size. Average particles sizes on the order of as low as 250 μm (microns) and as high as 3 mm, as measured by Laser Diffraction on a Sympatec Rodos Helos laser particle size analyzer, are conventional. Coffee flakes can also be used.

What may also be used is a mixture of ground roast coffees having different densities, different Hunter L colors, different particle sizes, different moisture contents, and different combinations thereof (i.e., one ground roast coffee could have a low density and a high moisture content while another ground roast coffee could have a medium density and a low moisture content). Thus, the ground roast coffees can be mixtures of regular and high density coffees, mixtures of regular and low density coffees, mixtures of high and low density coffees, and mixtures of high, regular and low density coffees, if desired.

Flavorants:

The flavorants that can be used include those known to the skilled artisan, such as natural and artificial flavorants. These flavorants may be chosen from synthetic flavor oils and flavoring aromatics, and/or oils, oleo resins and extracts derived from plants, leaves, flowers, fruits and so forth, and combinations thereof. Representative flavor oils include: cinnamon oil, hazelnut oil, cocoa oil, peppermint oil, oil of nutmeg, oil of sage, and oil of bitter almonds. Also useful are artificial, natural or synthetic fruit flavorants such as vanilla, chocolate, coffee, cocoa and citrus oil, including lemon and orange, grapefruit and fruit essences including apple, peach, strawberry, raspberry, and so forth. These flavorants can be used individually or in admixture. Commonly used flavors include mints such as peppermint, artificial vanilla, cinnamon derivatives, and various fruit flavors, whether employed individually or in admixture. Flavorants such as aldehydes and esters including cinnamyl acetate, cinnamaldehyde, citral, diethylacetal, dihydrocarvyl acetate, eugenyl formate, p-methylanisole, and so forth may also be used. Generally, any flavorants or food additive, such as those described in Chemicals Used in Food Processing, publication 1274 by the National Academy of Sciences, pages 63-258, may be used. Further examples of aldehyde flavorings common to flavoring coffee include, but are not limited to acetaldehyde (apple); benzaldehyde (cherry, almond); cinnamic aldehyde (cinnamon); citral, i.e., alpha citral (lemon, lime); neral, i.e. beta citral (lemon, lime); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavors); butyraldehyde (butter); valeraldehyde (butter); citronellal (modifies, many types); decanal (citrus fruits); aldehyde C-8

(citrus fruits); aldehyde C-9 (citrus fruits); aldehyde C-12 (citrus fruits); 2-ethyl butyraldehyde (berry fruits); hexenal, i.e. trans-2 (berry fruits); tolyl aldehyde (cherry, almond); veratraldehyde (vanilla); 2-6-dimethyloctanal (green fruit); and 2-dodecenal (citrus, mandarin); cherry; grape; mixtures thereof; and the like.

Flavorants can also be commercially obtained from suppliers. For example, Blueberry Crumb flavorant SD011340 is commercially available from Mane, Lebanon, Ohio (Hereinafter "Mane"). Peach Cobbler flavorant 742211 05103T is commercially available from Firmenich, Princeton, N.J. (Hereinafter "Firmenich"). Red Velvet Cake flavorant AF151900 is commercially available from Arylessence, Marietta, Ga. (hereinafter "Arylessence"). Strawberry Shortcake flavorant NT-940-927-1 is commercially available from Givaudan, Cincinnati, Ohio (hereinafter "Givaudan"). Pumpkin Pie flavorant, a mixture of 67.6% by weight of Pumpkin Kobocha Type 533484 2TP1554 and 32.4% by weight of Cinnamon & Cream Type 596025 2TP0504, is commercially available from Firmenich. Chocolate Fudge flavorant SD011675 is commercially available from Mane. Pistachio flavorant SD011853 is commercially available from Mane. Almond flavorant 26015 is commercially available from Henry H. Ottens, Philadelphia, Pa. (hereinafter "Henry H. Ottens"). Green Apple flavorant AE147862 is commercially available from Arylessence. Cherry flavorant 742212 04210T is commercially available from Firmenich. Strawberry flavorant F109384 and Spiced Pear flavorant F107348 are both commercially available from Mane.

Colorants:

The colorants of the invention are used in amounts effective to produce the desired color. The useful colorants include pigments such as titanium dioxide. Colorants can also include natural food colors and dyes suitable for food, drug and cosmetic applications. These colorants are known as FD&C dyes and lakes. The materials acceptable for the foregoing spectrum of use are typically water-soluble, and include FD&C Blue No. 2, which is the disodium salt of 5,5-indigotindisulfonic acid. Similarly, the dye known as Green No. 3 comprises a triphenylmethane dye and is the monosodium salt of 4-[4-N-ethyl-p-sulfobenzylamino) diphenyl-methylene]-[1-N-ethyl-N-p-sulfonium benzyl)-2, 5-cyclo-hexadienimine]. Examples of colorant include Cherry Liquid Color Solution 00385 (a mixture of FD&C Blue #1 and FD&C Red #40), Yellow Liquid Color Solution 00417 (FD&C Yellow #5), Lime Green Liquid Color Solution 00317 (FD&C Green #3), Emerald Green Color Solution 00308 (a mixture of FD&C Blue #1 and FD&C Yellow #5), Cream Yellow Liquid Color Solution 00307 (a mixture of FD&C Yellow #5 and FD&C Yellow #6), Blueberry Liquid Color Solution 00658 (a mixture of FD&C Red #40 and FD&C Blue #1), Blue Liquid Color Solution 00767 FD&C Blue #1), and Red Liquid Color Solution 00325 (FD&C Red #40), which are all commercially available from Sensient, St. Louis, Mo.

In providing the coffee composition, the flavorant and the colorant (if any) and the roasted and ground coffee may be blended into a homogenous mixture using known techniques. Preferably, the mixture is sealed into an air-tight bag to prevent degradation during storage.

The first coffee composition (as well as the second coffee composition) is subject to an extraction step (i.e. step (ii) in SUMMARY OF THE INVENTION) using water to make a coffee brew, commonly known as black coffee. Typical methods for brewing roast and ground coffee suitable for use with the invention include, for example, but are not limited to automatic drip coffee makers (ADC), single cup coffee making devices utilizing a single serving of coffee contained within a unit such as a cup, disk, pod, or capsule, French press, electric espresso/cappucchino makers, percolators, Moka pot/stove top espresso makers, drip-type/non-electric coffee makers, and coffee strainers.

As known to the skilled artisan, the amount of water used in this step may be in the range of from about 20 to about 30 ml per gram of the coffee composition. For example, 1420 ml of water may be used to extract 58.5 grams of the coffee composition, which indicates a usage of water in the amount of 24.4 ml per gram of the coffee composition. Although there is no specific limitation on the temperature of the water used in this step, in preferred embodiments, the water temperature is from about 185° F. to about 205° F., such as 195° F. The extraction step may be carried out with any suitable device, and in preferred embodiments, an Automatic Drip Coffee (ADC) Maker is used.

In step (iii) of SUMMARY OF THE INVENTION, the coffee brew prepared in step (ii) is mixed with a whitening agent and a sweetener to produce the coffee beverage. Any known whitening agents and sweeteners may be used in this step. In an exemplary embodiment, the whitening agent may be a liquid such as milk in the amount of 7-15% (e.g. 11.1%) by volume of the coffee brew. For example, 1 US fluid ounce of milk may be mixed into 9 US fluid ounces of coffee brew to make a cup of coffee for consumption.

The sweetener may be a solid such as white granulated sugar in the amount of 1.9-2.2% (e.g. 2.07%) by weight of the coffee brew. For example, 5.5 grams of white granulated sugar may be mixed into 266.2 grams of coffee brew to make a cup of coffee for consumption. In various embodiments, one or more high intensity sweeteners and optional sweetness flavor enhancers may be used to completely or partially replace an amount of the regular white sugar, as along as the sweetness remains unchanged.

Examples of whitening agent include liquid dairy components, such as liquid milk, liquid skim milk, liquid non-fat milk, liquid low fat milk, liquid whole milk, liquid half & half, liquid light cream, liquid light whipping cream, liquid heavy cream, liquid lactose free milk, liquid reduced lactose milk, liquid sodium free milk, liquid reduced sodium milk, liquid dairy fortified with nutrients, such as vitamins A, D, E, K, or calcium, liquid high protein dairy, liquid whey protein concentrate, liquid whey protein isolate, liquid casein concentrate, liquid casein isolate, etc. Examples of whitening agent may include dry dairy components, such as whole dry milk, non-fat dry milk, low fat milk powder, whole milk powder, dry whey solids, de-mineralized whey powders, individual whey protein, casein dairy powders, individual casein powders, anhydrous milkfat, dried cream, lactose free dairy powder, dry lactose derivatives, reduced sodium dairy powder, etc. The present embodiments also include calorie-free dairy, cholesterol free dairy, low calorie dairy, low cholesterol dairy, light dairy, etc. Also included are combinations of any of the above liquid or dry dairy components in any ratio.

Other suitable sweeteners that can be used in the invention are those well known in the art, including both natural and artificial sweeteners. These suitable sweeteners include, e.g. water-soluble sweetening agents such as monosaccharides, disaccharides and polysaccharides such as xylose, ribose, glucose (dextrose), mannose, galactose, fructose (levulose), sucrose (sugar), maltose, invert sugar (a mixture of fructose and glucose derived from sucrose), partially hydrolyzed starch, corn syrup solids, dihydrochalcones, monellin, steviosides, and glycyrrhizin; water-soluble artificial sweeteners such as the soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (acesulfame-K), the free acid form of saccharin, and the like; dipeptide based sweeteners, such as L-aspartic acid derived sweeteners, such as L-aspartyl-L-phenylalanine methyl ester (aspartame) and materials described in U.S. Pat. No. 3,492,131, L-alpha-aspartyl-N-(2,2,4,4-tetramethyl-3-thietanyl)-D-alaninamide hydrate, methyl esters of L-aspartyl-L-phenylglycerin and L-aspartyl-L-2,5,dihydrophenyl-glycine, L-aspartyl-2,5-dihydro-L-phenylalanine, L-aspartyl-L-(1-cyclohexyen)-alanine, and the like; water-soluble sweeteners derived from naturally occurring water-soluble sweeteners, such as a chlorinated derivative of ordinary sugar (sucrose), known, for example, under the product description of sucralose; and protein based sweeteners such as thaumatoccous danielli (Thaumatin I and II).

High intensity sweeteners, including sucralose, aspartame, acesulfame potassium, saccharin, neotame, and the like, and combinations thereof, may optionally be employed. High intensity sweeteners (and other sweeteners) may be expressed as an amount to yield the same sweetness as an amount of (referred to herein as "AYSSA") another sweetener such as sucrose. For these calculations, sucralose is considered to be 600 times as sweet as an equal weight of sucrose, maltitol is considered to be 0.9 times as sweet as an equal weight of sucrose, sorbitol is considered to be 0.6 times as sweet as an equal weight of sucrose, and isomalt is considered to be 0.40 times as sweet as an equal weight of sucrose. Thus, for example, 1 g of sucralose is an AYSSA 600 g of sucrose.

Any suitable colorant or a mixture of different colorants may be used in the present invention, as long as it renders the desired color in the coffee beverage. There are different ways to scientifically characterize the color of a product. For example, a Lab color space is a color-opponent space with dimension L for lightness and a and b for the color-opponent dimensions, based on nonlinearly compressed CIE XYZ color space coordinates. As known to a skilled artisan, the dimensions of the Hunter 1948 Lab color space are represented as L, a, and b, while those of CIE 1976 Lab color space are represented as L*, a*, b* (hereinafter CIELAB). The difference between Hunter and CIE color coordinates is that the CIE coordinates are based on a cube root transformation of the color data, while the Hunter coordinates are based on a square root transformation.

In various embodiments, the coffee beverage produced from the first coffee composition has a CIELAB coordinate of (L1 *, a1*, b1*). In contrast, the coffee beverage produced from the second coffee composition has a CIELAB coordinate of (L2*, a2*, b2*). The kind and amount (i.e. C parts) of the colorant is such that $0<\Delta L^*\leq 7.89$, $-16.74\leq\Delta a^*<0$, and $0<\Delta b^*\leq 5.08$, wherein $\Delta L^*=L2^*-L1^*$, $\Delta a^*=a2^*-a1^*$, and $\Delta b^*=b2^*-b1^*$. For example, the coffee beverage produced from the first coffee composition may have a CIELAB coordinate of (L1 *, a1*, b1*)=(44.01, 28.56, 31.01), and the coffee beverage produced from the second coffee composition has a CIELAB coordinate of (L2*, a2*, b2*)=(51.90, 11.82, 36.09). In some embodiments, the amount of the colorant in term of "C parts" is in the range of from about 1.0 part to about 3.0 parts, such as 1.8 parts, based on 100 parts by weight of the roasted and ground coffee in the first coffee composition. In preferred embodiments, the colorant comprises FD&C Red 40.

As described above, any suitable flavorant or mixture of flavorants may be used in the present invention. In various embodiments, the amount of the flavorant present in the first coffee composition in term of "(F−ΔF) parts" may be simply calculated based on the values of F and ΔF, relative to 100 parts by weight of the roasted and ground coffee in the first coffee composition. For example, F=2.0-4.0 such as 3.08, and $(F\times 20.1\%)\geq\Delta F\geq(F\times 13.0\%)$. In preferred embodiments, the flavorant comprises strawberry shortcake flavorant.

Strawberry shortcake flavorant is defined as a flavorant that imparts a strawberry shortcake taste in the coffee beverage. While it is difficult to give a scientific definition of strawberry shortcake taste, it is more convenient to define the taste by referring to a representative recipe for making a traditional strawberry shortcake, the taste of which will be clearly identifiable to a skilled food technologist. For example, a representative recipe that can be used to prepare a typical strawberry shortcake which consists of an 8-inch round cake and two layers of strawberries topped with whipped cream will include the following ingredients: 3 pints fresh strawberries, 0.5 cup white sugar, 2.25 cups all-purpose flour, 4 teaspoons baking powder, 2 tablespoons white sugar, ¼ teaspoon salt, ⅓ cup shortening, 1 egg (beaten), ⅔ cup milk; and 2 cups whipped heavy cream. To make the strawberry shortcake these ingredients are then combined in the following manner. First, slice the strawberries and toss them with ½ cup of white sugar, and set aside. Second, preheat an oven to 425° F. (220° C.) and grease and flour one 8 inch round cake pan. Third, in a medium bowl combine the flour, the baking powder, the 2 tablespoons of white sugar and the salt to form a mixture. Fourth, use a pastry blender to cut the shortening into the mixture until it resembles coarse crumbs. Make a well in the center of the mixture and add the beaten egg plus milk, then stir until just combined to form a batter. Fifth, spread the batter into the greased and floured pan and bake at 425° F. (220° C.) for 15 to 20 minutes or until golden brown. Let the cake cool partially in the pan on the wire rack. Sixth, slice the partially cooled cake in half, making two layers, and then place half of the strawberries on one layer of cake and top with the other layer of cake. Seventh, cover the stacked cakes with the remaining strawberries and top with the whipped cream.

The following examples are provided for illustrative purposes only, and are in no way intended to limit the scope of the present embodiments.

EXAMPLES

In the following examples, a Mr. Coffee ADC brewer was used to brew roasted and ground coffees. The materials used include (1) Dunkin Donuts Original Blend Coffee Lot #4,016,230,101,038, commercially available from The J. M. Smucker Company, Orrville, Ohio; (2) N&A Strawberry Shortcake type flavorant NT-940-927-1 with Batch #ED00030906, commercially available from Givaudan, Cincinnati, Ohio; (3) 00325 Red Liquid Color R (FD&C 40, Lot #5114505), commercially available from Sensient, St. Louis, Mo.; (4) Half & Half milk as the whitening agent or creamer, commercially available from Smith Dairy, Orrville, Ohio; and (5) White Granulated Sugar as the sweetener, commercially available from, and distributed by, U.S. Food-service, Columbia, Md. 21045. The color of all the samples were measured using LabScan® XE Dual-beam spectrophotometer, obtained from HunterLab Inc. (Reston, Va.).

1420 mL of filtered water (reverse osmosis) at a temperature of about 195° F. was used to brew 58.5 grams of coffee samples. One fluid ounce (26.5 grams) of Smith's Diary Half and Half, 5.5 grams of white granulated sugar were added to a 12-ounce coffee cup, and then 9 fluid ounces (266.2 grams) of freshly brewed Strawberry Shortcake flavored coffee (with or without colorant) was added to the creamer and sweetener. The samples were stirred, and then served to two panelists for evaluation of flavor perception. The evaluation direction was to choose the strawberry shortcake flavored coffee with color that most closely tastes like the control sample without color.

Example 1

Control Sample (i.e. the Second Coffee Composition)

The control includes a homogenous mixture of 1.75 grams of the Strawberry Shortcake flavorant and 56.75 grams of Dunkin Donuts Original Blend as the roasted and ground coffee. No colorant was added in this sample (i.e. C=0 parts). The amount of the flavorant is therefore (F−ΔF) =F=3.08 parts, based on 100 parts by weight of the roasted and ground coffee.

Example 2

The First Coffee Composition wherein ΔF=13.0% F

The coffee composition in this example includes a homogenous mixture of 1.50 grams of the Strawberry Shortcake flavorant, 1 gram of 00325 Red Liquid Color R, and 56.00 grams of Dunkin Donuts Original Blend as the roasted and ground coffee. The amount of the colorant is therefore C=1.78 parts, and the amount of the flavorant is therefore (F−ΔF)=2.68 parts, based on 100 parts by weight of the roasted and ground coffee. In this example, ΔF=0.4 parts=13.0% F.

Example 3

The First Coffee Composition wherein ΔF=33.8% F

The coffee composition in this example includes a homogenous mixture of 1.15 grams of the Strawberry Shortcake flavorant, 1 gram of 00325 Red Liquid Color R, and 56.35 grams of Dunkin Donuts Original Blend as the roasted and ground coffee. The amount of the colorant is therefore C=1.78 parts, and the amount of the flavorant is therefore (F−ΔF)=2.04 parts, based on 100 parts by weight of the roasted and ground coffee. In this example, ΔF=1.04 parts=33.8% F.

Example 4

The First Coffee Composition wherein ΔF=−0.6% F

The coffee composition in this example includes a homogenous mixture of 1.73 grams of the Strawberry Shortcake flavorant, 1 gram of 00325 Red Liquid Color R, and 55.77 grams of Dunkin Donuts Original Blend as the roasted and ground coffee. The amount of the colorant is therefore C=1.79 parts, and the amount of the flavorant is therefore (F−ΔF)=3.10 parts, based on 100 parts by weight of the roasted and ground coffee. In this example, ΔF=−0.02 parts=−0.6% F.

Example 5

The First Coffee Composition wherein ΔF=20.1% F

The coffee composition in this example includes a homogenous mixture of 1.38 grams of the Strawberry Shortcake flavorant, 1 gram of 00325 Red Liquid Color R, and 56.12 grams of Dunkin Donuts Original Blend as the roasted and ground coffee. The amount of the colorant is therefore C=1.78 parts, and the amount of the flavorant is therefore (F−ΔF)=2.46 parts, based on 100 parts by weight of the roasted and ground coffee. In this example, ΔF=0.62 parts=20.1% F.

Example 6

The First Coffee Composition wherein ΔF=6.5% F

The coffee composition in this example includes a homogenous mixture of 1.61 grams of the Strawberry Shortcake flavorant, 1 gram of 00325 Red Liquid Color R, and 55.89 grams of Dunkin Donuts Original Blend as the roasted and ground coffee. The amount of the colorant is therefore C=1.79 parts, and the amount of the flavorant is therefore (F−ΔF)=2.88 parts, based on 100 parts by weight of the roasted and ground coffee. In this example, ΔF=0.2 parts=6.5% F.

Example 7

LabScan XE Hunter Color Measurements

All the coffee beverages produced from the coffee compositions of Examples 2-6 have an average CIELAB coordinate of (L1*, a1*, b1*)=(44.01, 28.56, 31.01). The coffee beverage produced from the control (i.e. the second coffee composition) in Example 1 has a CIELAB coordinate of (L2*, a2*, b2*)=(51.90, 11.82, 36.09).

Example 8

Panelists Evaluation of Flavor Perception

Two panelists (#1 and #2) were asked to taste the coffee beverages prepared from the coffee compositions in Examples 1-6. Then the panelists reported on which beverage tastes most like the control beverage prepared from the coffee composition in Example 1. The result is tabulated in Table 1.

| Coffee beverage, prepared from | Color (L*, a*, b*) | ΔF (% F) | Panelist #1 Flavor Evaluation | Panelist #2 Flavor Evaluation |
|---|---|---|---|---|
| Example 1 (Control) | (51.90, 11.82, 36.09) | 0 | Control | Control |
| Example 3 | (44.01, 28.56, 31.01) | 33.8 | Weaker than control | Weaker than control |
| Example 5 | (44.01, 28.56, 31.01) | 20.1 | Most like control | Weaker than control |
| Example 2 | (44.01, 28.56, 31.01) | 13.0 | Stronger than control | Most like control |
| Example 6 | (44.01, 28.56, 31.01) | 6.5 | Stronger than control | Stronger than control |
| Example 4 | (44.01, 28.56, 31.01) | −0.6 | Stronger than control | Stronger than control |

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A method of preparing a coffee beverage using reduced amount of added flavorant relative to a control coffee beverage, which comprises:

(i) providing a first coffee composition comprising:
 a) added colorant,
 b) added flavorant, and
 c) a roasted and ground coffee, wherein:
  i. the amount of added colorant is C parts, wherein $C>0$, and
  ii. the amount of added flavorant is $(F-\Delta F)$ parts, wherein $\Delta F$ is the reduced amount of added flavorant in the first coffee composition relative to a control coffee composition, F is the amount of added flavorant in the control coffee composition, $(F-\Delta F)>0$, and $(F\times 20.1\%)\geq\Delta F>0$; and
  iii. amounts C, F, and $\Delta F$ are measured as parts per 100 parts by weight of the roasted and ground coffee;
(ii) extracting the coffee composition with water to make a coffee brew; and
(iii) mixing a whitening agent and a sweetener into the coffee brew to produce the coffee beverage;

wherein the flavor perception of said coffee beverage is equivalent to the flavor perception of a coffee beverage produced from the same steps (i)-(iii) using the control coffee composition, wherein the control coffee composition comprises:
a) no added colorant,
b) the same added flavorant as the first coffee composition wherein the amount of added flavorant in the control coffee composition is F parts, and
c) essentially the same amount of the same roasted and ground coffee, water, whitening agent, and sweetener as the first coffee composition.

2. The method according to claim 1, wherein the amount of water used in step (ii) is 20-30 ml per gram of the coffee composition.

3. The method according to claim 1, wherein the temperature of water used in step (ii) is from about 185° F. to about 205° F.

4. The method according to claim 1, wherein step (ii) is executed with an Automatic Drip Coffee (ADC) Maker.

5. The method according to claim 1, wherein C=1.0-3.0.

6. The method according to claim 1, wherein the colorant comprises FD&C Red 40.

7. The method according to claim 1, wherein F=2.0-4.0.

8. The method according to claim 1, wherein $(F\times 20.1\%)\geq\Delta F\geq(F\times 13.0\%)$.

9. The method according to claim 1, wherein the flavorant comprises Strawberry Shortcake flavorant.

10. The method according to claim 1, wherein the whitening agent is a liquid.

11. The method according to claim 1, wherein the whitening agent usage in step (iii) is 7-15% by volume of the coffee brew.

12. The method according to claim 1, wherein the sweetener is a solid.

13. The method according to claim 1, wherein the sweetener comprises white granulated sugar.

14. The method according to claim 1, wherein the sweetener usage in step (iii) is 1.9-2.2% by weight of the coffee brew.

15. The method according to claim 1, wherein:
a) the coffee beverage produced from the first coffee composition has a CIELAB coordinate of ($L1^*$, $a1^*$, $b1^*$);
b) the coffee beverage produced from the control coffee composition has a CIELAB coordinate of ($L2^*$, $a2^*$, $b2^*$);
c) $\Delta L=L2-L1$, $\Delta a=a2-a1$, and $\Delta b=b2-b1$; and
d) $0<\Delta L\leq 7.89$, $-16.74\leq\Delta a<0$, and $0<\Delta b\leq 5.08$.

16. The method according to claim 1, wherein:
a) the coffee beverage produced from the first coffee composition has a CIELAB coordinate of ($L1^*$, $a1^*$, $b1^*$) =(44.01, 28.56, 31.01);
b) the coffee beverage produced from the control coffee composition has a CIELAB coordinate of ($L2^*$, $a2^*$, $b2^*$) =(51.90, 11.82, 36.09).

17. The method according to claim 1, wherein the added flavorant comprises one or more flavorants selected from the group consisting of: artificial or natural flavorants; synthetic flavor oils; synthetic flavoring aromatics; oils, oleo resins, and extracts derived from plants, leaves, flowers, and fruit; artificial, natural, or synthetic fruit flavorants; aldehydes; esters; and combinations thereof.

18. The method according to claim 17, wherein the added flavorant is selected from the group consisting of vanilla, chocolate, coffee, cocoa, lemon, orange, grapefruit, lime, mandarin, apple, peach, strawberry, raspberry, cherry, grape, spicy fruits, citrus fruits, berry fruits, green fruit, mint, peppermint, cinnamon, almond, cream, butter, and combinations thereof.

19. The method according to claim 17, wherein the added flavorant is a flavor oil selected from the group consisting of cinnamon oil, hazelnut oil, cocoa oil, peppermint oil, oil of nutmeg, oil of sage, oil of bitter almonds, and combinations thereof.

* * * * *